United States Patent [19]

Roberts et al.

[11] Patent Number: 4,643,257
[45] Date of Patent: Feb. 17, 1987

[54] METHOD OF RECOVERING HYDROCARBONS FROM AN UNDERGROUND FORMATION

[75] Inventors: David L. Roberts; Johan F. G. van Velzen, both of Rijswijk, Netherlands

[73] Assignee: Shell Oil Company, Houston, Tex.

[21] Appl. No.: 722,919

[22] Filed: Apr. 15, 1985

[30] Foreign Application Priority Data

May 16, 1984 [GB] United Kingdom ............... 8412476

[51] Int. Cl.$^4$ .............................................. E21B 43/24
[52] U.S. Cl. ................................... 166/303; 166/305.1
[58] Field of Search ...................... 166/303, 305.1, 279

[56] References Cited

U.S. PATENT DOCUMENTS

| 3,393,737 | 7/1968 | Richardson | 166/300 |
| 3,438,443 | 4/1969 | Prats et al. | 166/303 |
| 4,078,610 | 3/1978 | Arnold | 166/280 |
| 4,102,398 | 7/1978 | Harnsberger | 166/276 |
| 4,475,595 | 10/1984 | Watkins et al. | 166/303 |
| 4,506,733 | 3/1985 | Hyne et al. | 166/303 |

Primary Examiner—Stephen J. Novosad
Assistant Examiner—Bruce Kisliuk

[57] ABSTRACT

To prevent dissolution of siliceous grains or siliceous bonds between grains in or around a well when aqueous fluid is passed through the well in an oil recovery process, the siliceous solids are at least once treated with a solution of Co ions in a solvent such as water.

8 Claims, No Drawings

METHOD OF RECOVERING HYDROCARBONS FROM AN UNDERGROUND FORMATION

BACKGROUND OF THE INVENTION

The invention relates to a method of recovering hydrocarbons from an underground formation via a well which is at least partly surrounded at the level of the formation by sand grains.

Within the meaning of the claims and the specification the expression "sand grains" is to be understood to relate to grains substantially consisting of silica. The sand grains either consist of grains that are originally present in the formation, or of grains that have been introduced in or around the well for filling up voids around the well, for forming a gravel pack, or for any other reason.

The inflow into the well of sand grains that are entrained by the flow of fluid passing out of the formation into the well should be prevented. Such inflow of sand grains results in sanding-up of the well which requires costly cleaning operations when the production rate of the well decreases. Further, the tubing in the well as well as the surface equipment will be damaged by the erosive action of those sand grains that are passed to the surface by the fluid flow.

Inflow of sand grains into a well will occur when the bond between the formation sand grains is insufficiently strong to withstand the forces enacted thereon by the flow of fluid passing through the pore space of the formation into the well. One manner to solve this sand problem is to place a gravel pack in the well, such pack consisting of an unconsolidated volume of sand grains of predetermined size, which grains are kept in place by a screen pipe. The screen pipe is a short string of casing protecting the face of the producing formation and preventing, by means of its screening property, the formation sand grains from flowing into the well.

Failure of a gravel pack occurs when hot aqueous fluids pass through the pack over extremely long periods. The grains are partly dissolved in the hot fluid and the size reduction of the grains that accompanies such dissolution allows the grains to pass through the openings of the screen pipe and enter the well.

Further, a sand problem will be met in a well when passing hot aqueous fluid through an adjacent siliceous earth formation wherein the sand grains are interconnected by a silicate cementing material. Whereas no sand problem will exist in such well when low temperature fluids are passed therethrough, it will be found, however, that hot aqueous fluids dissolve the silicate cementing material thereby weakening the bonds between the grains until the strength of the bonds is insufficient to withstand the forces enacted on the grains by the fluid flow passing from the formation into the well. The sand grains are then sheared off and enter the well.

The majority of the consolidation processes that are suitable in formations wherein relatively cold fluids pass through the wells and the formation surrounding the wells, have been found to fail when the recovery process carried out in the formation is replaced by a process that includes the use of hot aqueous fluid. There are a limited number of processes, however, that render the formation resistant against the attack of hot fluids, but these processes are too costly for actual application. One such process is described in U.S. Pat. No. 3,393,737. A metal plating compound in the liquid phase is injected into the formation and deposits an uninterrupted metal layer over the surface of sand grains contacted by the compound. Although this metal layer forms an effective protection against degradation by hot aqueous fluid passing along the sand grains and the natural bond—if present—between the grains, no widespread application of this process has taken place since the process is chemically complicated and thus expensive as highly qualified chemists should be in charge of the operation.

U.S. Pat. No. 3,323,124 describes a method for inhibiting gravel pack and formation sand stone dissolution during water or steam injection, by coating the surface of the sand and the gravel with a fatty film of lecithin. A drawback is that the lecithin requires the presence of a dispersant to disperse it in the water phase of the treating liquid.

In U.S. Pat. No. 3,438,443 it is suggested to solve the problem by dissolving silica in the liquid phase of the hot fluid to be injected. By using a saturated solution of silica, the sand formation is protected from being leached by the hot fluid. Even sand grains that have previously been consolidated by an emulsion of water glass and kerosene followed by an aqueous solution of calcium chloride were found to be insoluble in the hot aqueous drive fluids oversaturated by silica. The tests wherein an oversaturated silica solution was used as a hot aqueous fluid indicated that no degradation of the consolidated sand took place, contrary to the use of solutions of sodium aluminate that were found to degrade the consolidated sand almost as rapidly as fresh water.

A drawback, however, of the use of oversaturated silicate solutions is that the amount of silica that is deposited on the sand grains when the solution cools down in the formation, will decrease the permeability of the formation, which requires continuously increasing pressures to maintain a constant injection rate of the hot aqueous fluid into the formation. Such increased injection pressures may even lead to fracturing of the formation, which results in by-passing of large formation parts by the injection fluid.

U.S. Pat. No. 3,603,399 indicates that water-sensitive clays are stabilized by treatments with specified aqueous solutions of hydroxyl and aluminum ions, although such clays were not stabilized by treatment with similar solutions containing only aluminum and chloride ions. U.S. Pat. No. 3,809,160 indicates that water production can be selectively retarded by injecting an aqueous solution containing polyvalent metal ions ahead of an aqueous solution containing polymers which react with those ions to form insoluble gels.

Commonly assigned U.S. patent application Ser. No. 605,040 filed Apr. 30, 1984, discloses that the dissolving siliceous solids by a hot aqueous fluid flowing within a well containing siliceous solids can be reduced by contacting the siliceous solids with a polar liquid solution containing aluminum or aluminate ions substantially as soon as those solids are contacted with the hot aqueous liquid. The disclosures of that application are incorporated herein by reference.

SUMMARY OF THE INVENTION

The present invention relates to flowing aqueous liquid into contact with siliceous solid material in or around a well borehole while reducing the extent to which such material dissolves in the flowing liquid by contacting the solid material with a polar liquid solution containing cobalt ions at least substantially as soon as that material is contacted by the flowing liquid. Said polar solution preferably contains an effective proportion of water and between about 0.5 and 100 ppm cobalt ions at Co concentrations required for slowing down the rate at which the silicate gel that bonds the grains together is dissolved by the formation water passing through the pore space of the consolidated formation part and is a solution from which cobalt ions tend to be deposited as cobalt silicates on siliceous solids without requiring an electroless metal plating process.

DESCRIPTION OF THE INVENTION

Applicant has now found that dissolution of siliceous material in or around a well by aqueous liquid that passes through the pore spaces of such material, can be diminished in a more simple manner than in the prior art processes. The inventive method is applicable to diminish dissolution of sand grains when contacted by hot aqueous fluid, which grains either belong to the original structure of the formation, or form part of material that has been passed downhole of the well after the well has been drilled, such as gravel pack material.

The method is also suitable to diminish degrading of siliceous cementing material originally present between the formation grains when the cementing material is contacted by a hot aqueous liquid passing therethrough. Also, the method can be used to inhibit degradation by formation water of the bonding material between grains that have been artificially consolidated by hydrolysis of silicon polyhalide.

In one embodiment of the invention, the aqueous liquid and the cobalt-containing solution are passed via the well into the formation and have a temperature above 50° C.

The aqueous liquid and/or the cobalt-containing solution may be injected into the formation in the presence of steam.

The solvent in which the cobalt ions are contained may be water, ethanol or any other polar liquid or mixtures thereof. When the aqueous liquid is injected into the formation via the well, at least part of the aqueous liquid may constitute at least part of the solvent to which Co ions are added.

When grains of the reservoir formation have been artificially consolidated by means of silicon tetrahalide treatment, the cementing bond thus formed can be protected against dissolution by formation water passing from the formation into the well together with oil and/or gas that flows from the formation into the well, by treating the grains with a solution of Co ions in a polar solvent. The cobalt-containing solution is passed through the well to the sand grains, and kept either stagnant for a predetermined period in the zone to be treated, or passed therethrough at a relatively low rate. This treatment may be carried out either only once or periodically.

The present method is suitable for protecting siliceous formations and gravel packs, where the sand or pack grains consist of siliceous material, against degradation by the action of aqueous liquid passing therethrough. Such sand grains of a formation can be those consolidated either naturally, or artificially by the action of silicon polyhalide. The grains of a gravel pack are normally unconsolidated siliceous sand organic grains but may comprise other granular solids consolidated by the action of silicon polyhalide.

Naturally consolidated sands are present in a number of formations. These sands do not require a consolidating treatment by means of a silicon polyhalide, unless the compressive strength thereof is insufficient to maintain the sand grains in place at the flow rates of the fluids that are produced through the pore space of the grains.

Before carrying out the method according to the invention in a production well, all sand grains around the well at the production level thereof that may enter the well during the production period can advantageously be treated by means of silicon polyhalide to interconnect the sand grains or strengthen the bonds originally present between the grains.

Injection wells wherein sand problems may occur during backflow of fluid into the well are mostly provided with gravel packs. Such packs may not require a silicon polyhalide pretreatment for interlocking the grains if those grains comprise solids which are not soluble in hot aqueous liquids.

Silicon polyhalide can be easily handled in the field to consolidate unconsolidated formations, to increase the compressive strength of incompetent formations, and to interconnect loose sand grains in or around wells. Suitable silicon polyhalides have a water reactivity substantially equal to that of silicon tetrachloride, silicon hexachloride, silicon octochloride, and silicon tetrafluoride.

Consolidating procedures by means of silicon tetrahalide are extensively described in U.S. Pat. No. 3,055,426 and United Kingdom Pat. No. 1,536,209. In the consolidation method of U.S. Pat. No. 3,055,426, a silicon tetrachloride-oil solution is passed into an oil-containing formation. The silicon tetrachloride reacts with the connate water in the formation pore space thereby undergoing a hydrolysis reaction and forming a precipitate that bonds the sand grains together without appreciably diminishing the permeability of the treated zone. U.S. Pat. No. 3,055,425 mentions the application of heat to the zone consolidated by the action of silicon tetrahalide to a temperature above about 150° C. for at least six hours to stabilize the consolidated zone against the flow of water therethrough. The heating may be carried out by a hot fluid such as steam or water. Tests carried out by applicant, however, gave no indication of an appreciable diminishing of the degradation of the consolidated zone by treating the zone with hot aqueous fluid. According to the same patent specification the heat may also be supplied by a downhole burner. A drawback is that the use of such a burner requires complicated and expensive procedure.

The method of the United Kingdom Pat. No. 1,536,209 is designed for consolidating incompetent parts of a silicate formation containing gas, such as hydrocarbon gas. Silicon tetrahalide is injected via the well into the formation in gaseous form together with a carrier gas. The silicon tetrahalide gas is dissolved in the connate water present on the pore space walls of the gas-containing formations. The silicon tetrahalide is hydrolyzed thereby forming a precipitate that bonds the sand grains together (when the formation is unconsolidated) or strengthens the bond between the sand grains (when the formation is naturally consolidated but has a low compressive strength). This method can also be used in an oil-containing formation wherein the part to be treated has beforehand been freed from oil by a gas injection. The consolidated material proved to be stable in stagnant water. To protect the consolidated material against flowing water it was advised to render the material oil wettable either solely at the surface thereof, or throughout the bulk of the material. Unfortunately, the resistance against the attack of flowing water proves to be rather weak.

Useful agent for application in the method of the present invention, which agents—after being dissolved in a solvent such as water—release Co ions, are inter alia cobalt-II salts such as cobalt chloride. Cobalt chloride can be generally used, but is in particular suitable for use in aqueous solutions having a pH between 4 and 10.

It will be appreciated that the amount of Co ions is chosen to be effective in preventing or at least to a substantial amount diminishing the degradation of the consolidated part of the formation via which fluids pass from the bulk of the formation into the well and vice versa.

A suitable amount of these agents when applied (e.g., periodically) for treating an artificially consolidated formation or artificially consolidated gravel pack against the attack of formation water (such as connate water that is produced from a gas formation) is between 0.5 and 100 ppm of Co in a solution of a polar solvent. Particularly suitable concentrations of Co ions are between 10 and 50 ppm. The solution is obtained by mixing the agents with a volume of polar solvent, such as water. The solution is passed into the formation pore space of the zone that has earlier been consolidated by means of silicon polyhalide, and kept stagnant therein for a predetermined period. The treatment may be repeated as many times as required. Also, the solution may be pumped slowly through the zone to be treated.

When the hydrocarbon recovery process comprises the step of injecting hot aqueous fluid into the formation, the agents may be continuously or periodically added to the flow of hot aqueous fluid that is being injected into the well. A suitable amount of the treating agent is between 0.5 and 100 ppm of Co in the liquid phase of the hot aqueous fluid injected for increasing the recovery rate of hydrocarbons from the formation. Particularly suitable concentrations of Co ions are between 10 and 50 ppm.

The hot aqueous fluid that may be injected in one of the embodiments of the present invention for displacing oil in an underground formation towards one or more production wells penetrating the formation, may be either hot water or wet steam. The wet steam consists partly of steam and partly of hot water. The hot water may comprise salts as well as other agents that have been added on purpose to the hot water for treatments other than protecting the consolidation of the formation against the attack of hot fluids. Such agents may have been added for carrying out surface treatments of the injection water prior to injecting the water into the well. Well known agents for such purpose are lime soda (softener), ammonium bisulphite (oxygen scavenger) and polyphosphate (scale inhibitor).

The rate at which degradation of the formation takes place during the passage of aqueous fluid therethrough is decreased or even stopped by the presence of Co ions therein. The mechanism by which Co ions are capable of preventing the degradation of gravel pack or formation is not yet fully understood. It is theorized, however, that in the presence of water at least some of the Co ions are converted into cobalt hydroxide ($Co(OH)_4$) which reacts with the silica surface of gravel pack or formation to produce a relatively insoluble cobalt silicate.

The invention will now be described by way of example in more detail with reference to the following Examples and Designs for a field experiment.

EXAMPLE I 200 gram of 20/40 U.S. mesh Ottawa sand was packed in a cylindrical core holder and liquid water (pH=7) was pumped through at a rate of 10 ml/min.; temperature 250° C.; pressure 100 bar. The silica concentration in the effluent water was measured at regular intervals using a spectrophotometer. On average 200 ppm was detected. In a second experiment an aqueous Co chloride solution (pH=7) containing 10 ppm Co was pumped through the same pack under the same conditions as in the first experiment. It was found that after having pumped 1 liter (=23 pore volumes) of the above Co chloride solution, the silica concentration in the effluent had decreased from 200 to 50 ppm. Thus, the degree to which silica is dissolved by hot aqueous fluid is considerably decreased by the addition of Co ions to the fluid. It will therefore be appreciated that this method is attractive to decrease the degree at which the sand grains of a gravel pack in an injection well are dissolved, through which injection well continuous injection of hot aqueous liquid takes place for enhanced oil recovery purposes.

Design for a field experiment I

In an oil containing underground formation, hot water is being injected via a plurality of injection wells and oil is being displaced by the hot water through the formation pore space towards production wells, via which wells the oil is lifted to the surface.

Since the hot water injection is stopped from time to time, backflow of fluid will occur in the injection wells. As long as the formation area around the wells consists of consolidated sand grains, no sand will enter the wells when backflow occurs. However, prolonged injection of hot water via the wells into the formation will dissolve the cement bond between the sand grains which results in unconsolidated formation parts around the wells. When backflow occurs, sand will enter the wells and plug the passage therethrough. To prevent the deterioration of the cement bonds by the flow of hot aqueous liquid therealong, cobalt chloride is continuously added to the hot water that is being injected into the wells. 50 ppm of cobalt is considered sufficient to prevent the formation of a loose pack of grains around the well, which grains might otherwise enter the wells and plug the well when the flow of fluid is interrupted occasionally.

Design for a field experiment II

Under the conditions as mentioned in the above Design I, the continuous injection of cobalt chloride into the flow of hot water that is being passed into the injection wells is replaced by a periodic injection of cobalt chloride. The concentration of the Co ions is then increased to above 500 ppm and takes place as many times as required at suitable intervals.

Design for a field experiment III

In the Design II, one or more of the periodic injections of Co citrate into the flow of hot water that is being passed into the wells, is or are replaced by the injection of an aqueous solution of Co ions at ambient temperature.

Design for a field experiment IV

Wet steam is being injected into an oil containing underground formation via a plurality of wells. The oil is driven through the formation to production wells. The formation parts around the injection wells have a relatively low compressive strength, and to prevent sand inflow into the wells when the steam injection is stopped, a gravel pack has been installed in each well. The pH of the injected wet steam is relatively low, and thereto cobalt chloride has been selected as a source for the Co ions that are added to the wet steam to decrease the dissolution of the sand grains of the gravel packs in the wells. Thus, no sand will enter the wells when backflow of fluid into the well occurs when the steam injection is stopped during repair operations.

Design for a field experiment V

Relatively dry gas is produced from an underground formation via a plurality of production wells. The formation originally consisted of loose sand grains and to prevent the grains from being entrained by the flowing gas and being deposited in the wells, a sand consolidation treatment has been carried out in the early life of the wells. This sand consolidation treatment was carried out by injecting silicon tetrahalide in a carrier gas via each well into the pore space of the formation part around the relevant well. The silicon tetrahalide thereby formed a silica gel on the sand grains by a hydrolyzing reaction taking place between the silicon tetrahalide and the water film present on the pore space of the formation part being treated by the consolidation process. Hereby the loose sand grains were bonded together without an appreciable permeability reduction.

During the following production period, the water film on the untreated formation parts will, however, not remain stagnant but enter the treated formation part under influence of the flow of gas that is being produced via the production wells. This water on passing through the pore space of the consolidated formation parts will slowly dissolve the silica gel bonding the grains together, which will eventually lead to the production of loose sand grains that are entrained by the flowing gas to the production wells. To prevent this dissolution of the cement bond, the consolidated areas around the well are periodically treated by a volume of liquid having Co ions dissolved therein.

The liquid volume may consist of water containing more than 500 ppm Co, which volume is kept stagnant in the formation part to be treated for about 24 hours. After the production of the gas out of the formation is resumed, the liquid volume flows into the wells from which it is recovered. The treatment is repeated as many times as required depending on the agressiveness of the formation water.

Design for a field experiment VI

The solution of Co ions as applied in Design V that is kept stagnant in the formation parts to be treated, is replaced by the use of a solution of 500 ppm cobalt chloride or more in water that is injected slowly a period of about one hour. This solution of Co ions is at least once formed. If required, the mixing of Co ions with water is repeated before injecting the solution into the formations, as many times as required at suitable intervals. In the majority of cases the treatment should be repeated every 6 months, but it will be appreciated that the length of the period over which production takes place before sand troubles can be expected, depends on the aggressiveness of the formation water, as well as on the concentration of Co ions in the aqueous solution.

Design for a field experiment VII

Oil is to be recovered via a well that penetrates an unconsolidated sand formation. The sand is oil wet. To decrease the inflow of sand grains into the well during recovery of oil and formation water, the formation part around the well is first made water-wet. Thereto an aqueous surfactant solution is injected into the said formation part. Suitable surfactants for this purpose are alkylaryl sulphonates and polyethylene oxide esters.

Subsequently, a solution of silicon tetrachloride in kerosene is passed into the said formation part. The silicon tetrachloride reacts with the water present on the water-wet walls of the pore space of the formation part to be consolidated, thereby bonding the grains together by the precipitate resulting from the reaction.

Thereafter, the consolidation grains are at least once treated by an aqueous solution of Co chloride, and the well is opened for production of oil together with formation water. The treatment with Co ions is repeated as many times as required at suitable intervals and at Co concentrations that are required for slowing down the rate at which the silicate gel that bonds the grains together is dissolved by the formation water passing through the pore space of the consolidated formation part.

What is claimed is:

1. In an oil producing process in which aqueous liquid is flowed into contact with siliceous solid material in and around a well borehole, an improvement for reducing the extent to which the siliceous solid material is dissolved in the aqueous liquid, comprising:
   contacting the siliceous solid material with a polar liquid solution containing an effective amount of water and between about 0.5 and 100 ppm cobalt ions at Co concentrations that are required for slowing down the rate at which the silicate gel that bonds the grains together is dissolved by the formation water passing through the pore space of the consolidated formation part in a solution from which the cobalt ions tend to be deposited as cabalt silicates on siliceous solids, without requiring an electronless metal plating process, at least substantially as soon as the siliceous solid material is contacted by the flowing aqueous liquid.

2. The method according to claim 1, wherein the aqueous liquid and the solution are passed via the well into the formation and have a temperature above 50° C.

3. The method according to claim 2, wherein the aqueous liquid and/or the solution are injected into the formation via the well in the presence of steam.

4. The method according to claim 1, wherein the aqueous liquid is injected into the formation via the well and at least part of the aqueous liquid constitutes at least part of the solvent to which Co ions are added.

5. The method according to claim 1, wherein the aqueous liquid is formation water that passes from the formation into the well.

6. The method according to claim 5, wherein the sand grains are periodically treated by a solution of Co ions.

7. The method according to claim 6, wherein the solution of Co ions is kept stagnant in the formation for a predetermined period.

8. The method according to claim 1, wherein the solution contains between 10 and 50 ppm of Co.

* * * * *